Aug. 27, 1963                G. DALLA VALLE                3,101,732
                             MOUTHPIECE REGULATOR
Filed Dec. 26, 1961                                    2 Sheets-Sheet 1

INVENTOR.
GUSTAV DALLA VALLE
BY
Flam and Flam
ATTORNEYS.

Aug. 27, 1963     G. DALLA VALLE     3,101,732
MOUTHPIECE REGULATOR
Filed Dec. 26, 1961     2 Sheets-Sheet 2
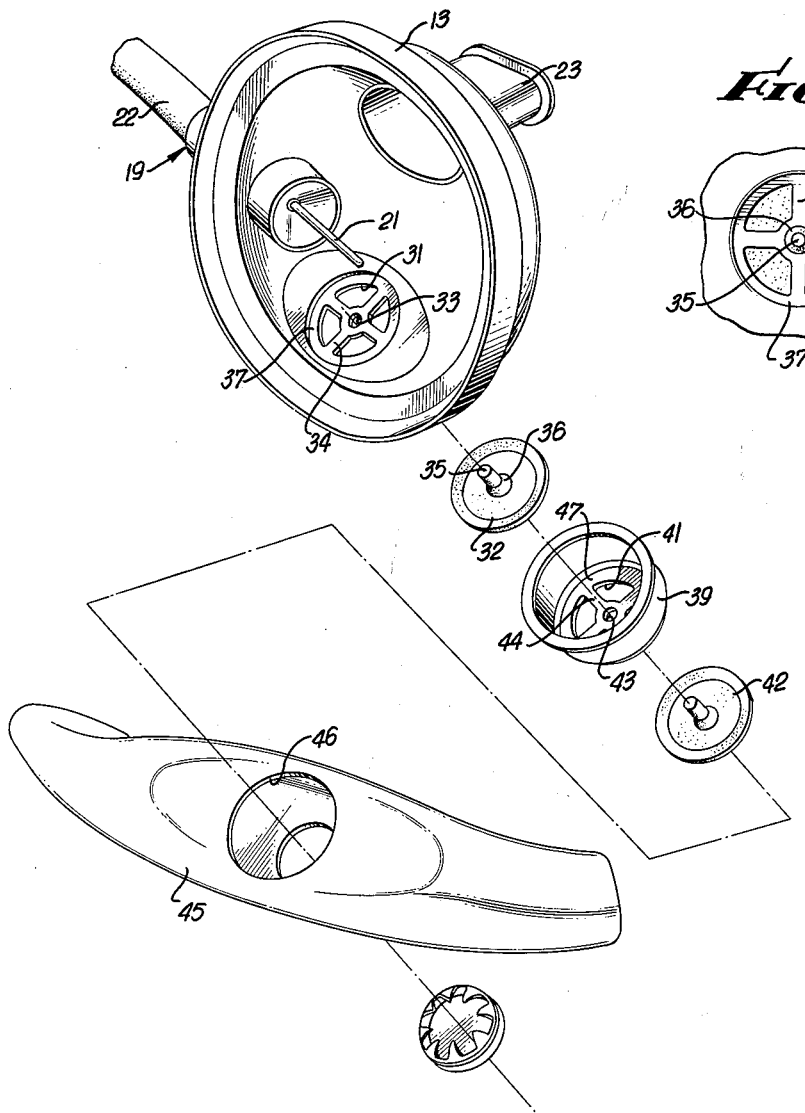
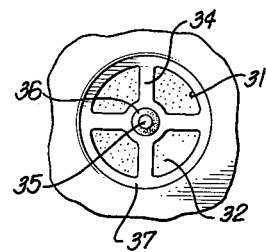
GUSTAV DALLA VALLE
INVENTOR.
BY *Flam and Flam*
ATTORNEYS.

3,101,732
MOUTHPIECE REGULATOR
Gustav Dalla Valle, Los Angeles, Calif., assignor to Healthways, Los Angeles, Calif., a corporation of California
Filed Dec. 26, 1961, Ser. No. 161,799
2 Claims. (Cl. 137—63)

This invention relates to underwater breathing apparatus, and particularly to a terminal stage regulator intended to be located adjacent the diver's mouth, and in which used gases are expelled from the regulator chamber via a non-return valve. This regulator is sometimes called a mouthpiece regulator.

There are advantages to a regulator of this type in comparison with one in which the terminal stage regulator is located at a relatively remote tank on the diver's back. For example, high pressure air can be conducted to the area of the diver's mouth by a small hose that creates much less drag than low pressure hoses which would be necessary with a remotely located regulator. However, a disadvantage has developed. Water tends to seep into the regulator chamber due to the characteristics of the exhaust valve. This seepage itself might be tolerable because the collected water can be purged from the regulator chamber in the same manner that water is purged from a face mask. However, the inlet valve is located close to the exhaust valve, and the turbulence created by incoming gases acts upon whatever water may be collected to create a mist in the regulator chamber. This mist is most obnoxious to the diver.

The object of this invention is to provide an improved mouthpiece regulator in which the inlet stream of air is precluded from creating a mist in the regulator chamber. While baffle plates or special configurations of a regulator chamber could be provided, this would involve expensive special designs. Furthermore, such an arrangement might not be 100% effective especially as the diver assumes various orientations resulting in the collected water moving about in the regulator chamber. In accordance with the present invention, the water is trapped in a space separate from the regulator chamber whereby the inlet stream has no chance to act upon the collected water no matter what the diver's orientation may be.

Another object of this invention is to create a separate space for collected water by simple structural means.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIG. 4 is an exploded pictorial view illustrating the manner in which some of the parts are assembled; and FIG. 5 is a fragmentary elevational view taken as indicated by a plane corresponding to line 5—5 of FIG. 2.

Figure 1:
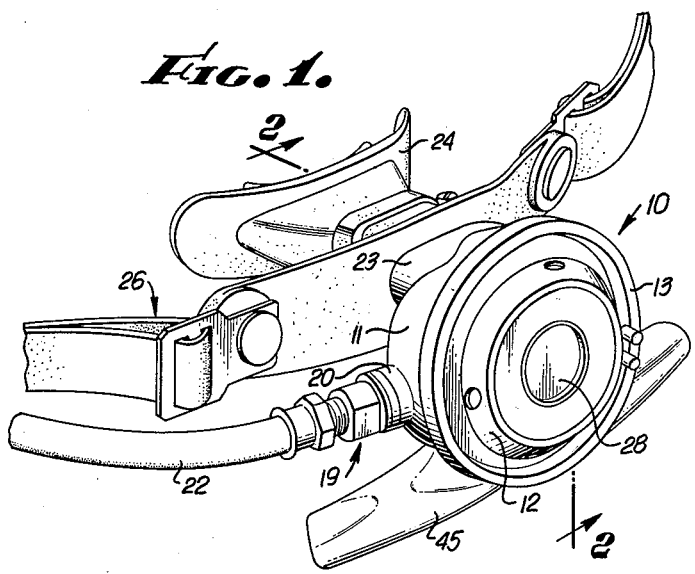
FIGURE 1 is a pictorial view of a mouthpiece regulator incorporating the present invention.
Figure 2:
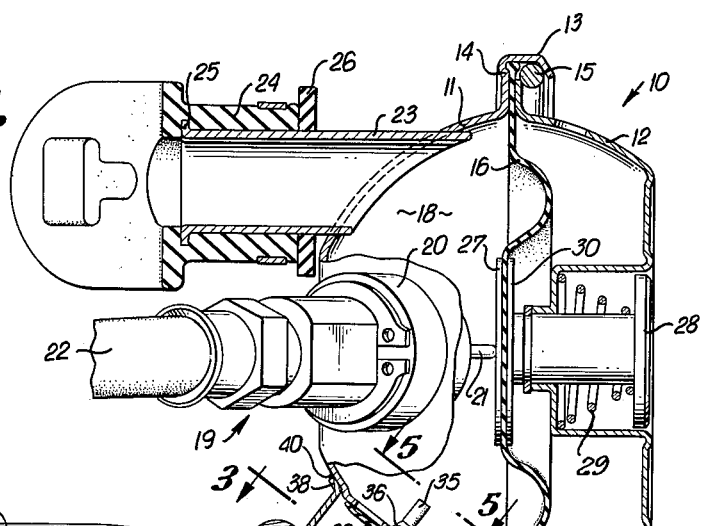
FIG. 2 is an enlarged sectional view taken along a plane corresponding to line 2—2 of FIG. 1.
Figure 3:
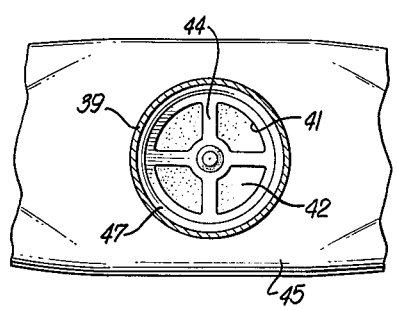
FIG. 3 is a sectional view taken along a plane corresponding to line 3—3 of FIG. 2.

In FIG. 1, there is illustrated a regulator 10 comprising a case 11 and a ported cover 12. The case 11 is generally of cup-shaped configuration having an annular rim 13 surrounding its generally circular opening. The rim 13 provides an outwardly facing annular seat 14 in which the edge of the cover 12 is received. A snap ring 15 fits in the rim 13 and holds the parts together.

A flexible diaphragm 16 has an integral peripheral ring 17 which is clamped between the seat 14 and cover edge.

Air is admitted into the chamber 18 defined by the casing 11 and the diaphragm 16 via an inlet valve structure 19. As shown in FIG. 1, this valve structure is attached to an external boss 20 formed near the bottom of the casing 11. The axis of the boss and the valve structure therein supported is inclined to the plane of the casing opening. The valve structure 19, which may be of any suitable form, has a tilt closure 21 (see also FIG. 4) the end of which falls adjacent the plane of the casing opening and in the path of inward movement of the central portion of the diaphragm 16.

A hose 22 supplies high pressure air to the valve structure 19. When the closure 21 is tilted, the valve opens and air is admitted into the chamber 18. The air so admitted is drawn into a mouthpiece extension 23 that projects rearwardly of the casing 11 at a place spaced from the valve structure 19. In the present example, the mouthpiece extension 23 is located near the casing flange 13 and so that its axis is generally perpendicular to the plane of the casing opening.

A rubber or equivalent mouthpiece 24 is fitted and secured to the flared end 25 of the tube 23. When the mouthpiece 24 is held in the diver's mouth, the casing 11 extends downwardly and in front of the diver's chin; the inlet hose 22 passes over the diver's right shoulder. A head strap 26 (see also FIG. 1) assists in maintaining the mouthpiece 24 in the diver's mouth.

Upon inhalation, the flexible diaphragm 16 flexes inwardly to engage and operate the closure 21 thereby to supply air at ambient pressure. To provide reinforcement against wear at the area of engagement, a circular plate 27 is provided on the inside of the diaphragm.

A button 28 mounted centrally of the cover and spring biased outwardly by a coil spring 29 is also engageable with the central portion of the diaphragm 16 in order to open the valve structure 19 independently of the diver's inhalations. A reinforcing plate 30 is also provided at the outside of the diaphragm for engagement with the button 28. The plates 27 and 30 are riveted together or otherwise suitably secured.

As the diver exhales, the used gases are returned to the chamber 18 and pass outwardly thereof via an exhaust port 31. This port is situated at that portion of the casing opposite the mouthpiece extension 23 so that, in use, the port 31 is oriented downwardly. This port is normally closed by a non-return flap closure 32 made of thin rubber or like material. The closure 32 overlies the outer edges of the port 31, and is supported at the central aperture 33 of an integral web 34 extending across the outlet port 31. The closure 32 has a central stem 35 that extends through the aperture 33. The stem 35 furthermore has a flange 36 that locks the closure in place.

An annular land 37 surrounding the outlet port 31 is received in a flange 38 of a cup 39 into which exhausted air from the casing is passed. A circular weld 40 secures the cup 39 to the exterior of the casing 11. The bottom of the cup 39 furthermore has a second exhaust opening 41. This exhaust opening is closed by a second flap closure 42 that is similar to the closure 32. The valve member 42 is attached at an aperture 43 formed centrally of an integral web 44 that extends across the exhaust opening 41.

An open ended diverter tube 45 receives the exhausted air and permits escape on either side of the diver's face at a place where the air bubbles will not interfere with his vision. The diverter tube 45 has a central inlet opening 46 that fits over an annular land 47 surrounding the outlet opening 41, and is welded in place.

The interior of the diverter tube 45 is normally subjected to the ambient fluid. The viscous drag of the fluid tends to open the exhaust valve 42 without there being an excess pressure in the diaphragm chamber 18. The viscous drag is substantial when the diver quickly moves his head in the water. The drag readily lifts the delicate flap closure 42. Any water entering cup 39, however, travels no farther. There is no viscous or other force tending to open the inner valve member 32 because the cup forms a shield therefor. Accordingly, water precluded from entering the diaphragm chamber 18, and accordingly, no mist is created due to the high velocity inlet air streams produced upon opening of the valve structure 19.

Any water collected in the cup 39 is normally purged at each exhalation.

The inventor claims:

1. In a mouthpiece regulator of the type having a casing provided with an exhaust port, a circular flap of flexible material overlying the port with the edges of the flap on the outside of the port, and an exhaust diverter tube having an intermediate aperture adapted freely to circumscribe said flap and to be attached to said casing about said exhaust port, the combination therewith of a cup having its flange edges attached to said casing and circumscribing said flap to receive the exhausted gases from said casing, the base of the cup being attached to said diverter tube at its said aperture; said cup having an exhaust port communicating with said diverter tube; and a flap mounted by said cup forming at the exhaust port of said cup a non-return valve normally to prevent return flow into said cup.

2. In underwater breathing apparatus: a casing; a high pressure valve having a movable valve operating part in the casing and discharging breathable gases into the casing; a regulating diaphragm subjected on opposite sides to the ambient pressure and the pressure in the casing for moving said valve operating part; means forming an exhaust port from the casing; a non-return valve controlling said exhaust port; a trap receiving the gases expelled through said casing; said trap having an exhaust port; a non-return valve controlling the exhaust port of said trap; an exhaust diverter tube open at both ends and having an intermediate aperture; and means securing said diverter tube to said trap so that expelled gases from the trap pass into the diverter tube at its said aperture.

References Cited in the file of this patent

UNITED STATES PATENTS

| | | |
|---|---|---|
| 2,310,022 | Heidbrink | Feb. 2, 1943 |
| 2,581,007 | Douglas | Jan. 1, 1952 |
| 2,921,594 | Mayo | Jan. 19, 1960 |
| 2,989,062 | Gruget | June 20, 1961 |